United States Patent [19]

Thompson

[11] Patent Number: 4,770,326

[45] Date of Patent: Sep. 13, 1988

[54] GOLF CLUB CARRIER FOR BICYCLES

[76] Inventor: Clifford A. Thompson, 15107 Runbell Pl., Houston, Tex. 77095

[21] Appl. No.: 859,369

[22] Filed: May 5, 1986

[51] Int. Cl.$^4$ ................................................ B62J 9/00
[52] U.S. Cl. .................................. 224/39; 224/32 A; 280/202
[58] Field of Search ............ 280/289 A, 202, DIG. 6; 224/35, 39, 31, 32 A, 32 R, 40; 206/315.2, 315.3, 315.6

[56] References Cited

U.S. PATENT DOCUMENTS

| | | | |
|---|---|---|---|
| 1,563,816 | 12/1925 | Worthington | 206/315.2 |
| 3,164,185 | 1/1965 | Ingoldt | 206/315.2 |
| 3,167,284 | 1/1965 | Lynch | 224/32 R |
| 3,744,688 | 7/1973 | Kezer | 224/32 R |
| 3,827,613 | 8/1974 | Meyer | 224/32 A X |
| 4,387,836 | 6/1983 | Laesch | 224/32 A |

FOREIGN PATENT DOCUMENTS 835557  4/1952  Fed. Rep. of Germany .... 224/39 R

*Primary Examiner*—Henry J. Recla
*Assistant Examiner*—David Voorhees
*Attorney, Agent, or Firm*—Neal J. Mosely

[57] ABSTRACT

A golf club carrier to be attached to a bicycle for transporting golf clubs and other golfing accessories comprises a main supporting frame adapted to be removably received and supported on the rear portion of the bicycle frame about the rear wheel and has a plurality of rigid outer tubular members secured to the sides of the main supporting frame at each side of the rear wheel, each of which slidably received a golf club. The supporting frame has U-shaped upper and lower frame members structurally reinforced by a pair of upright frame support members. A kick stand is mounted pivotally on the main supporting frame and movable to a down position for adjustably supporting the bicycle and frame filled with clubs in a generally upright position. Additional golf accessories may be carried in a box-like container secured on the supporting frame.

9 Claims, 2 Drawing Sheets

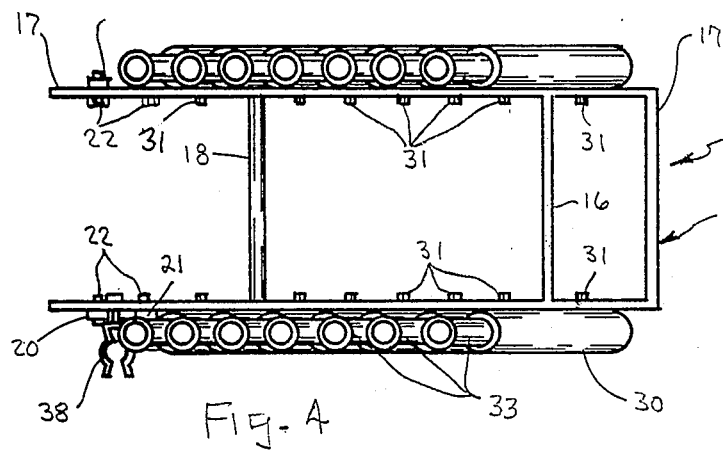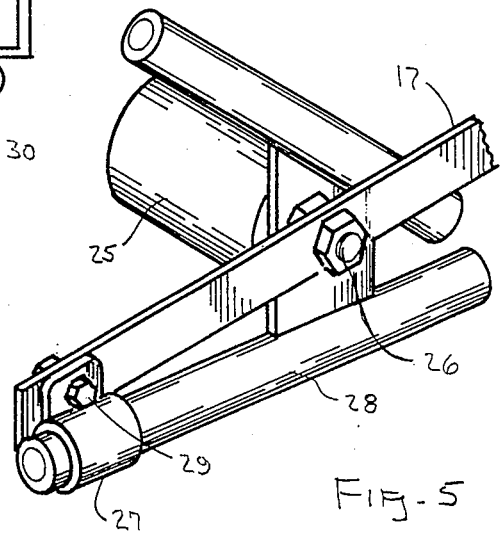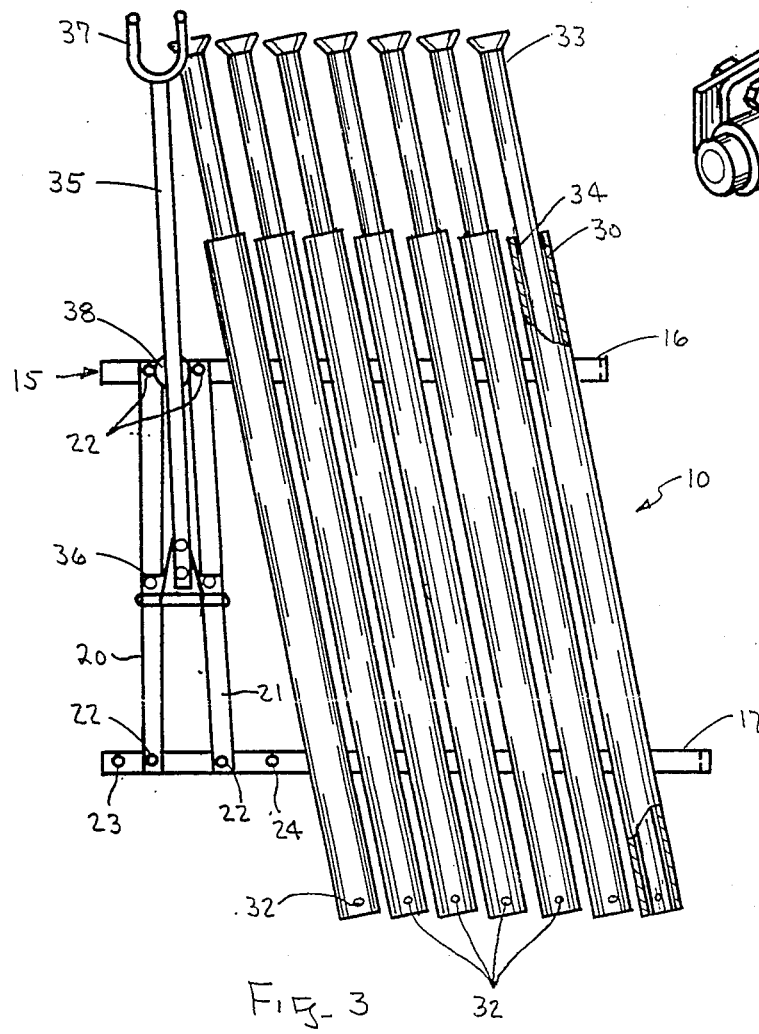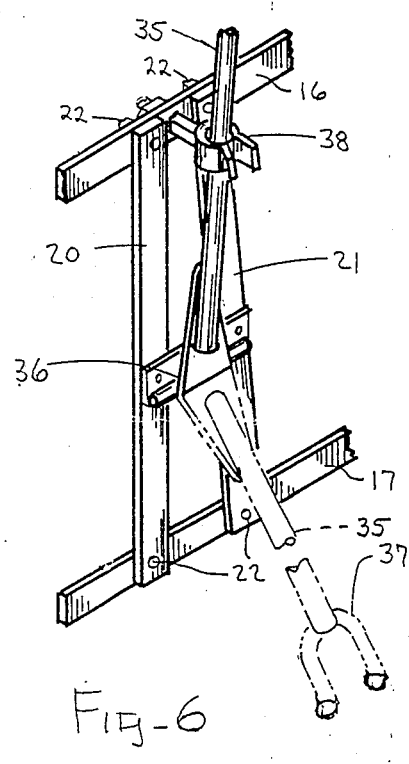

GOLF CLUB CARRIER FOR BICYCLES

BACKGROUND OF THE INVENTION

1. Field of the Invention

This invention relates generally to golfing accessories, and more particularly, to a golf club carrier for use on bicycles and the like.

2. Brief Description of the Prior Art

The golfer playing an average nine or eighteen hole golf course must cover a substantial distance carrying a heavy bag of numerous irons and woods used in playing the course. The golfer may walk the course carrying the bag on his shoulder, or may pull it behind in a small cart. If he chooses not to derive the benefits of the exercise inherent in walking, he may ride in a motorized or self propelled golf cart.

Pedal powered vehicles, such as bicycles and tricycles, have been devised to carry the golf bag. These rider propelled vehicles are more comfortable than walking and offer superior exercise. Some of these vehicles have expensive modified frames to receive the generally cylindrical golf bag. Others have a bag carrying frame adapted to be mounted on the vehicle.

The mounting of a generally cylindrical golf bag on such vehicles is not particularly desirable because the weight of the bag when full of clubs is difficult to balance. The size and shape of the golf bag is an impediment to securing the bag in a readily useful position. The mounting arrangement must not interfere with the normal operation of the vehicle and movements of the rider.

There are several patents which disclose various rider propelled vehicles adapted to carry golf bags.

Laesch, U.S. Pat. No. 4,387,836 disclose a pedal powered tricycle having an elongated golf bag supporting frame mounted on the rear axle. The frame is generally L-shaped and includes an upstanding rectilinear portion which extends substantially the height of the bag, a circular pedestal at the bottom for supporting the weight of the bag, and a pair of U-shaped lateral support members which extend substantially around the sides of the bag to maintain the bag in a generally tilted vertical position parallel with the rectilinear portion.

Enright, U.S. Pat. No. 2,926,927 discloses a two wheeled coaster vehicle for transporting a golf club bag or golf clubs. The vehicle has no pedals and the rider may mount the vehicle and coast downhill. On flat or uphill terrain, the golfer pushes the vehicle. The vehicle frame is adapted to receive a golf bag in front of the rider and includes a pair of parallel L-shaped tubular struts disposed between the front wheel fork and the seat standard. A circular split tubular ring is secured to the lower portion of the struts and a pair of spaced arcuate bag supporting members are secured to the upper portion of the struts to extend around the sides of the bag. A modification of the frame replaces the arcuate bag supporting members with a pair of rectangular brackets enclosing a series of tubes for holding the clubs.

Stoffel, U.S. Pat. No. 2,034,258 discloses delivery tricycle which may be rider propelled or motor driven having a box attached to the frame for transporting various items. The vehicle is not particularly suited for use on a golf course, nor is it designed to carry golf clubs.

U.S. Pat. No. 3,592,487 and 3,664,693 of Mansperger and Gobby respectively disclose basket attachments for rider powered vehicles.

The present invention is distinguished from the prior art in general, and these patents in particular, by a golf club carrier removably received and supported on the rear portion of a bicycle.

SUMMARY OF THE INVENTION

It is therefore an object of the present invention to provide a golf club carrier for pedal powered bicycles.

It is another object of this invention to provide a golf club carrier which is easily and quickly installed on bicycles of various designs and styles.

Another object of this invention is to provide a golf club carrier which will not interfere with the movements of the rider or the operation of the vehicle to which it is secured.

Another object of this is to provide bicycle-mounted golf club carrier which efficiently distributes and balances the weight of golf clubs and other golfing accessories.

Another object of this invention is to provide a bicycle-mounted golf club carrier which maintains golf clubs and other golfing accessories in a readily accessible position for easy removal and replacement.

A further object of this invention is to provide a golf club carrier which when installed on bicycles provides the golfer with the benefits of cardiovascular stimulation, aerobic exercise, muscular development, and increased stamina while participating in his or her favorite sport.

A still further object of this invention is to provide a bicycle-mounted golf club carrier which is simple in construction, inexpensive to manufacture, attractive in appearance, and rugged and durable in use.

Other objects of the invention will become apparent from time to time throughout the specification and claims as hereinafter related.

The above noted objects and other objects of the invention are accomplished by a golf club carrier attached to a bicycle for transporting golf clubs and other golfing accessories comprising a main frame removably received and supported on the rear portion of the bicycle frame about the rear wheel and having a series of rigid outer tubular members secured to the sides of the main frame at each side of the rear wheel, each of which slidably receives a golf club. A kick stand is pivotally mounted on the main frame and movable to a down position for adjustably supporting the bicycle and frame filled with clubs in a generally upright position.

BRIEF DESCRIPTION OF THE DRAWINGS

FIG. 3 is a side elevation of the golf club carrier removed from the bicycle.

FIG. 4 is a top plan view of the golf club carrier of Fig. 1.

FIG. 5 is a partial perspective view of a portion of the golf club carrier showing mounting details.

FIG. 6 is a partial perspective view of the kick stand portion of the golf club carrier.

DESCRIPTION OF THE PREFERRED EMBODIMENT

Figure 1:
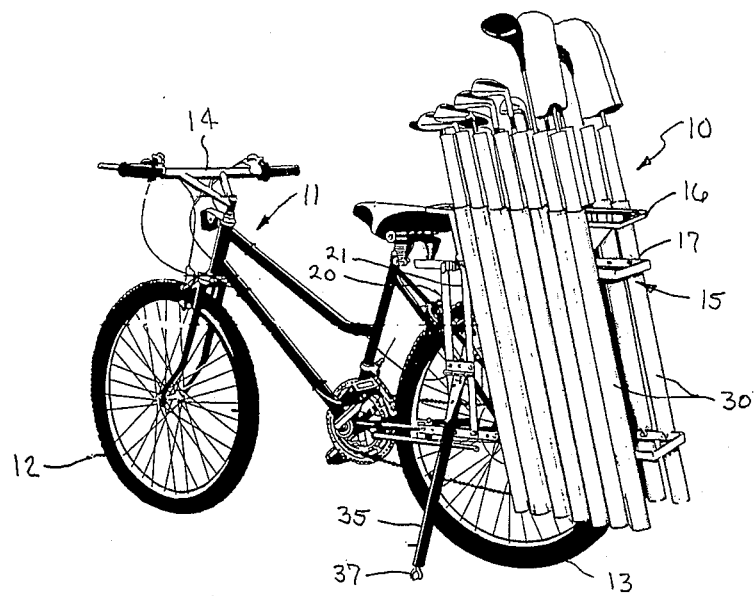
FIG. 1 is a perspective view of a preferred golf club carrier installed on the frame of a conventional bicycle.

Referring to the drawings by numerals of reference, there is shown in FIG. 1, a preferred golf club carrier 10 mounted on the rear of a conventional bicycle 11.

Being pedal powered, bicycle 11 is resresentative of various types and manufactures which are commercially available. Such a bicycle frame has a front wheel assembly 12 mounted at the front end, a rear wheel 13 assembly mounted on the rear fork of the frame in the conventional manner and is steerable by means handlebars 14. The conventional bicycle has a pedal crank mounted between the ends of the frame and a drive sprocket, a rear axle assembly and chain driven sprocket mounted on the rear fork and a chain operatively interconnecting the sprockets.

Although any style of bicycle may be used, a preferred bicycle is one having 5, 6, or 10 speed gearing and hand brakes for efficiency and safely in traversing the wide variety of surfaces and terrain encountered on golf courses. The preferred bicycle has a light weight frame to reduce weight, wide balloon tires to prevent damage to the surface of the course, and a soft comfortable seat.

Figure 2:
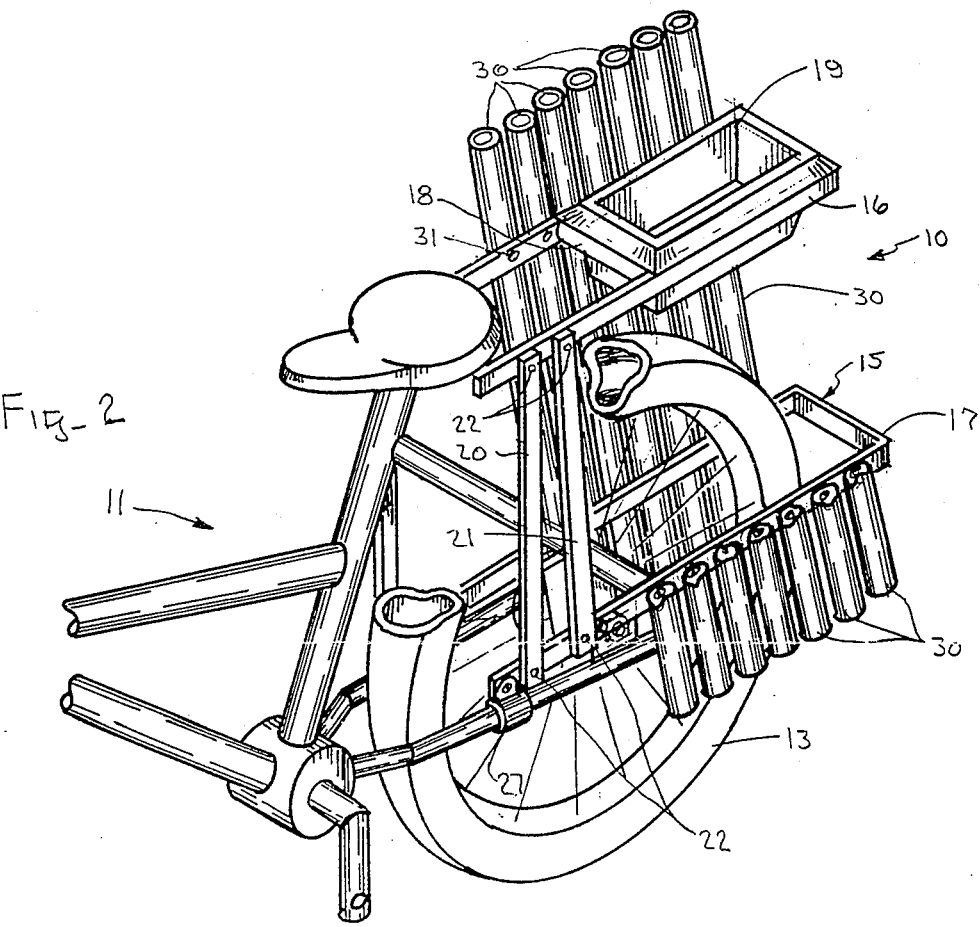
FIG. 2 is an enlarged perspective view of the rear portion of the bicycle having the carrier installed on the frame with the kick stand assembly and portions of the bicycle tire and carrier removed for clarity.

As shown in FIGS. 2 through 6, the carrier 10 comprises a frame 15 having vertically spaced upper and lower elongate, generally U-shaped frame members 16 and 17, respectively, formed of suitable material such as metal strap. A tubular crossmember 18 is secured transversely between the legs of the upper U-shaped member 16 for structural reinforcement. Tubular member 18 forms a rectangular opening with the back portion of the upper member 16 into which a box-like container 19, preferably molded plastic, is secured for holding miscellaneous golf accessories such as balls, tees, etc., (FIG. 2).

The lower U-shaped member 17 is slightly longer than the lower member 16 (FIG. 4). A pair of upstanding frame support members 20 and 21 are bolted at each end to the sides of U-shaped members 16 and 17 as indicated at 22 to brace the frame and provide a mount for the kick stand assembly (described hereinafter).

As shown in FIGS. 3 and 5, each leg of the U-shaped member 17 has a pair of mounting holes 23 and 24 near the open end. The outwardly extending bolt of the conventional rear axle 25 is received through the hole 24 and nut 26 secures the lower U-shaped member 17 to the rear axle. A clip 27 is installed on each of the lower tubular members 28 of the existing rear axle fork. The front end of the lower U-shaped member 17 is bolted as indicated at 29 to the clip 27 to further secure the lower frame member to the bicycle frame.

A series of open-ended, rigid plastic, outer tubes 30 are secured to the outer sides of the U-shaped members 16 and 17 by suitable means such as bolts 31. The head of the bolt and a washer is inside the tube 30 and the bolt secured by a nut on the inside surface of the U-shaped member. The bottom ends of the tubes 30 have a transverse pin or bolt 32 extending therethrough.

A series of conventional thin walled plastic golf club sleeves or tubes 33, slightly smaller in diameter and longer than the outer tubes 30 and secured to the outer tubes by the transverse pin or bolt 32. Additionally, a short cylindrical sleeve 34 of foam rubber or other resilient material is installed at the top of the outer sleeve fill the annulus between the exterior of the tubes 33 and the interior of the outer tubes 30 to prevent the innermost tube 33 from rattling.

The kick stand assembly (FIG. 6) comprises a tubular member 35 having one end secured to a hinge 36 mounted on one pair of the upright members 20 and 21 approximately intermediate the top and bottom ends. The other end of tubular member 35 is provided with U-shaped base member 37. A spring clip 38 is mounted on the upper U-shaped member 16 between the upright members 20 and 21 to receive and retain the tubular member 35 releasably in the up position.

By placing the pivot point of the kick stand intermediate the ends of the uprights, the combined weight of the bicycle and carrier filled with clubs is balanced to reduce the possibility of overturning when the bicycle is not being ridden. The pivotal range of the stand in the down position allows the bicycle to be balanced in a variety of angles relative to the verticle axis to compensate for uneven or inclined ground surfaces and uneven loads in the carrier. The base member 37 prevents the kick stand from sinking in soft ground and reduces the possibility of damaging the ground surface.

The golf carrier of the present invention may be easily manufactured from existing materials, assembled, and sold as assembled unit for installation by the purchaser. The carrier may also be sold unassembled in kit form to be assembled and installed by the user. Bicycles having carriers installed may also be sold or leased to golfing facilities for rental by golfers.

While this invention has been described fully and completely with special emphasis upon a preferred embodiment, it should be understood that within the scope of the appended claims the invention may be practiced otherwise than as specifically described herein.

I claim:

1. A kit of parts to be assembled into a golf club carrier for attachment to a bicycle comprising;
    an elongate generally U-shaped upper frame member having a series of laterally spaced mounting holes in each leg,
    an elongate generally U-shaped lower frame member having a series of laterally spaced mounting holes in each leg, one pair of which being adapted to receive the outwardly extending bolt of the velocipede rear wheel axle,
    a pair of threaded nuts to be threadedly received on the outwardly extending bolt of the bicycle rear wheel axle to secure said lower member thereon,
    a pair of clip fasteners to be installed on each side of the bicycle rear axle fork and attached to the open ends of said U-shaped lower member through the outward mounting holes of said lower member to secure said lower member to the frame of said bicycle,
    two pairs of upright frame support members each having mounting holes in each end, one pair to be secured at their top ends to each side of said upper U-shaped member and at their bottom ends to each side of said lower U-shaped member to connect and maintain said upper and lower members in a vertically spaced structurally reinforced relation,
    a tubular crossmember to be secured transversely between the legs of said upper U-shaped member for structural reinforcement thereof,
    a plurality of rigid tubular members having mounting holes at near their top and bottom ends to be secured at their top portion to each side of said upper U-shaped member and at their bottom portion to each side of said lower U-shaped member to connect and maintain said upper and lower members in a vertically spaced structurally reinforced relation and each adapted to slidably receive a golf club, a tubular stand member having a hinge mechanism at one end to be pivotally mounted on one pair of said upright frame support members, said stand movable to a down position for adjustably supporting said bicycle and said frame in a generally upright position, and releasable retaining means to be attached to said upper U-shaped member for releasably retaining said stand in an up position when not used to support said bicycle and said frame.

2. A kit of parts according to claim 1 further including a box-like container to be secured to said main frame for carrying golfing accessories.

3. A kit of parts according to claim 1 further comprising a plurality of thin walled inner tubes slightly smaller in diameter and longer than said rigid tubular members to be slidably received and supported inside said rigid tubular members for slidably receiving a golf club therein.

4. A kit of parts according to claim 3 including a cylindrical sleeve of resilient material disposed between the exterior of said inner tubes and the interior of said rigid tubular members to prevent said inner tubes from rattling moved.

5. A kit of parts according to claim 1 in which said stand member includes a base member at its ground-contacting end adapted to reduce damage to the ground surface therefrom and to prevent said stand from sinking in soft ground.

6. The combination with a bicycle comprising a bicycle frame having a steerable front wheel assembly mounted at the front end, a handlebar attached to said front wheel assembly for steering same, a rearwardly extending space fork at the rear end, a pedal crank mounted between the ends of the frame having drive sprocket fixed thereto, a rear wheel and axle assembly attached to the free ends of said fork having a chain driven sprocket mounted on said axle assembly, a chain operatively interconnecting said pedal crank sprocket with said rear wheel and axle chain driven sprocket for rotation thereof, and a seat mounted between the ends of the frame for supporting the rider, of a golf accessory supporting frame with spaced side portions removably secured to said fork at the rear end of said bicycle frame adapted to receive and carry individual golf accessories in a balanced condition on each side of the rear end of said vehicle, said golf accessory supporting frame comprises;

an elongate generally U-shaped upper frame member, an elongate generally U-shaped lower frame member spaced vertically below said U-shaped upper frame member and removably received and supported on said bicycle frame, a tubular crossmember secured transversely between the legs of said U-shaped upper frame member for structural reinforcement, a pair of upright frame support members disposed at each side of said U-shaped frame members and having their top ends secured to said U-shaped upper frame member and their bottom ends secured to said U-shaped lower frame member to structurally reinforce said main frame and maintain the vertically spaced relation of said upper and lower members, a plurality of tubular members secured to the side portions of said main frame and each adapted to slidably receive a golf club, said plurality of tubular members are secured to the sides of said U-shaped upper and lower frame members to structurally reinforce said main frame and maintain the vertically spaced relation of said U-shaped upper and lower frame members, and a stand pivotally mounted on said upright frame support members at one side of said main frame and movable to a down position for adjustably supporting said bicycle and said frame in a generally upright position, and releasable retaining means for releasably retaining said stand in an up position when not used to support said bicycle and said frame.

7. A combination according to claim 6 in which said upper and lower U-shaped frame members are removably received and supported on said vehicle frame about the rear wheel, and said tubular members are disposed at each side of said rear wheel.

8. A combination according to claim 7 in which said lower U-shaped frame member is removably secured to said rear wheel axle and to the fork at the rear end of said vehicle.

9. A combination according to claim 8 in which said lower U-shaped frame member has a pair of mounting holes in each leg thereof near the open end, the inward mounting holes receiving the outwardly extending bolt of the rear wheel axle assembly and said lower member secured thereon by a nut threaded on said axle bolt, and the open end of said U-shaped lower frame member is secured to said fork by a clip installed on each side thereof and secured through the outward mounting holes of said lower U-shaped frame member.

* * * * *